United States Patent [19]

McManus

[11] 4,422,615
[45] Dec. 27, 1983

[54] FLEXIBLE REFLECTOR ASSEMBLY FOR BICYCLES AND THE LIKE

[76] Inventor: Henry E. McManus, Box 543, 60 Woodhaven Dr., Belchertown, Mass. 01007

[21] Appl. No.: 380,331

[22] Filed: May 21, 1982

[51] Int. Cl.³ .............................................. B60R 1/06
[52] U.S. Cl. ................................. 248/475 R; 248/229
[58] Field of Search ............... 248/475 R, 475 B, 476, 248/472, 479, 485, 487, 287, 229, 496; 224/30 A, 40, 41; 403/57, 58, 53, 78, 79

[56] References Cited

U.S. PATENT DOCUMENTS

| | | | |
|---|---|---|---|
| 791,914 | 6/1905 | Jones | 248/229 X |
| 1,277,479 | 9/1918 | Ritchie | 248/229 X |
| 1,508,434 | 9/1924 | Ayres | 248/229 X |
| 1,513,769 | 11/1924 | Sullivan | 248/229 X |
| 2,509,687 | 5/1950 | Lee | 403/57 |
| 3,350,812 | 11/1967 | Lindsay | 403/58 X |

*Primary Examiner*—J. Franklin Foss
*Assistant Examiner*—Sarah A. Lechok
*Attorney, Agent, or Firm*—Leonard S. Michelman

[57] ABSTRACT

This invention comprises an attachment for a bicycle and the like.

It provides a safety device with a reflector to protect the operator of the bicycle from collision with other vehicles which may not see the bicycle.

The feature of the invention is an extension arm which has mounted at its end a reflector or signaling device.

The novelty of the invention is in the ability to rotate the extension arm backward or forward so that it becomes parallel to the bicycle wheel and also the ability to rotate the extension arm on its own axis 360° so that the signaling device can be adjusted to a predetermined angle.

There is a tongue mounted between the two segments of the extension arm. The tongue has fulcrum swivel mounts for permitting the arm to rotate on the swivel mounts.

The tongue is integral with a cylinder

The cylinder is locked into a clamp.

When the clamp is loosened, the cylinder can be rotated within the clamp, causing the rotation of the tongue and thereby rotating and changing the position of the reflector or signaling device so that its angle of reflection may be set to a desired position.

The clamp that holds the cylinder is integral with and a part of the body of another clamp which is attached to the fork or flange of the bicycle.

6 Claims, 5 Drawing Figures

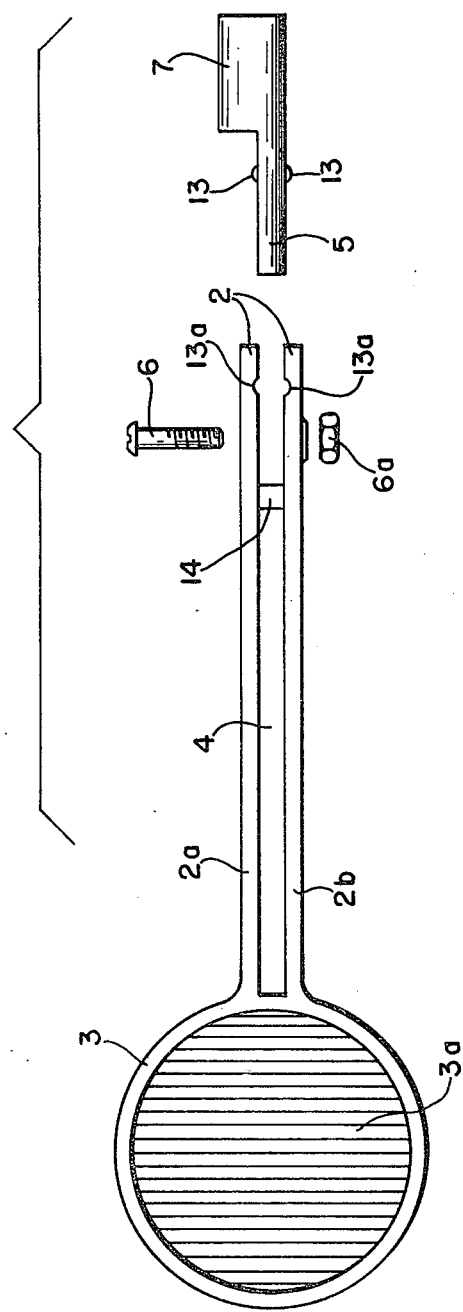
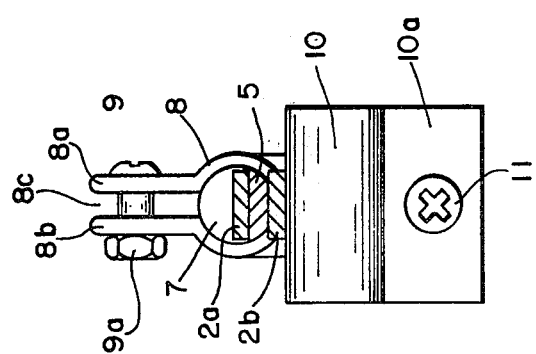

FLEXIBLE REFLECTOR ASSEMBLY FOR BICYCLES AND THE LIKE

The within invention is concerned with a safety device to be used with bicycles, motorcycles, and other similar type vehicles which are of the two wheel type and/or are narrow, and is particularly an improvement of a bracket attachment which supports an extension arm to which the safety device is fastened and has means that permit the arm to be secured to the vehicle in such a way that there is freedom of rotatability of the arm, both forward and backward 180° and permits 360° rotation of the arm on its own axis.

The use of reflectors attached to such type vehicles to protect the vehicle during darkness whereby light reflects is not a new concept, but enabling the equipment for horizontal and rotatable movement of said safety devices on a bicycle is an art upon which this invention has improved.

It is an object of the within invention to locate the safety device at a sufficient distance outwardly from the rear wheel of the vehicle on both sides thereof so that the reflection from light will be readily seen by the operator of a vehicle traveling there behind and also in front thereof.

It is a principal object of this invention to provide a novel support bracket for connecting the arm supporting the reflector to the rear of the bicycle or, if desired, to the front thereof.

It is an additional object of the within invention to provide bracket which is simple in construction and easy to mount upon a typical two wheel bicycle or the like.

It is a further object of the within invention to provide a bracket that permits 360° rotation of the arm to which the safety reflector or device is attached.

It is yet another object of the within invention to provide reflector that is mounted at the end of the arm which is rotatably fastened to a bracket that permits the positioning of the arm at various angles and also permits the arm to be folded back next to the bicycle frame when the bicycle or vehicle is being operated during daylight hours.

It is a primary object of this invention to provide an arm that rotates 360° permitting the adjustment of the reflectors, and also the folding of the arm forward and/or backward 90° for a total displacement of 180°.

It is an additional object of the within invention to provide an extension arm attachment to a bicycle for signaling so that there will be a warning to all traffic and travelers of the presence of a bicycle. The reflectors may be installed on both the front and rear surfaces at the end of the arm so that vehicles traveling in both front and rear directions from the bicycle will be warned of the presence of the bicycle or vehicle.

Reference is now made to a more detailed description of the invention and to the drawings, in which:

FIG. 2 is an exploded side elevational view of the component parts of the entire assembly of the invention.

FIG. 5 is a section view in elevation of the bracket assembly taken on line 5—5 of FIG. 3.

Figure 1:
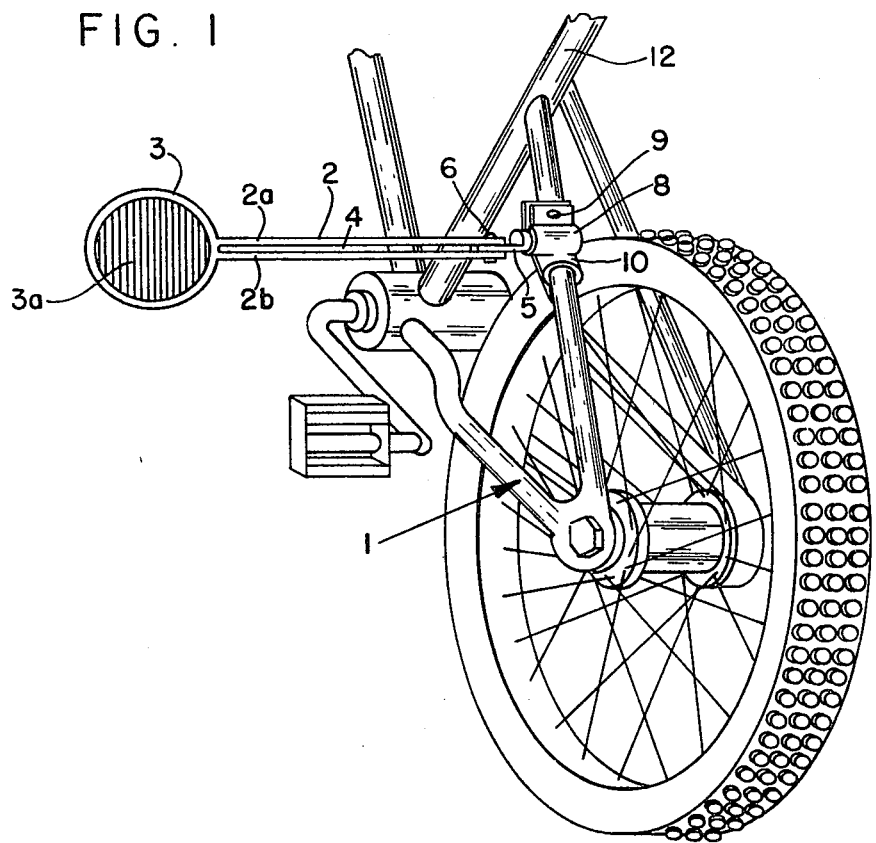
FIG. 1 is a perspective view of the rotatable-foldable reflector assembly connected to the rear wheel fork of a conventional bicycle.

The bicycle 12 has a frame 1 which is commonly referred to as the rear fork. At a point on frame 1 where the bicycle pedals will not interfere with the apparatus, hereinafter to be described, is located the bike (bicycle) clamp 10. The bike clamp 10 has the outside bike clamp flange 10a and the inside bike clamp flange 10b. There is a space 10c inside of the clamp 10 which permits the clamp 10 to be placed around the frame 1 of the bicycle 12. In the preferred embodiment, the shape of clamp 10 is cylindrical.

There is also an opening space 10d between the parallel surfaces of the flanges 10a and 10b.

Within the flanges 10a and 10b is the bike clamp lock screw assembly 11 which can take the form of a Phillips screw with a nut or a wing bolt nut assembly. In the preferred embodiment, the assembly is a Phillips type screw head 11 with a nut.

Integral with the body of the clamp 10 and made a part of said clamp 10 is the fulcrum clamp 8. The fulcrum clamp 8 is similar in structure to the clamp 10. It has a front flange 8a and a rear flange 8b. It extends above clamp 10.

There is a space 8c between the parallel flanges 8a and 8b. There is a cylindrical shaped opening within the clamp 8 in which the fulcrum cylinder 7 is located. Integral with the fulcrum cylinder 7 is the tongue support 5 which extends outwardly therefrom between the upper segment of the arm 2 at 2a and the lower segment of the arm 2 at 2b. The fulcrum swivel mounts 13 are located on the tongue 5 as can be seen in the view of FIG. 2. Mounts 13 protrude above the flat surfaces of tongue 5 on each side thereof.

The fulcrum mounts 13 are located, when assembled, in the fulcrum swivel cutouts 13a which are positioned respectively in the arm 2 near the ends of the segments 2a and 2b, adjacent to the tongue 5 as shown in FIG. 2.

Figure 3:
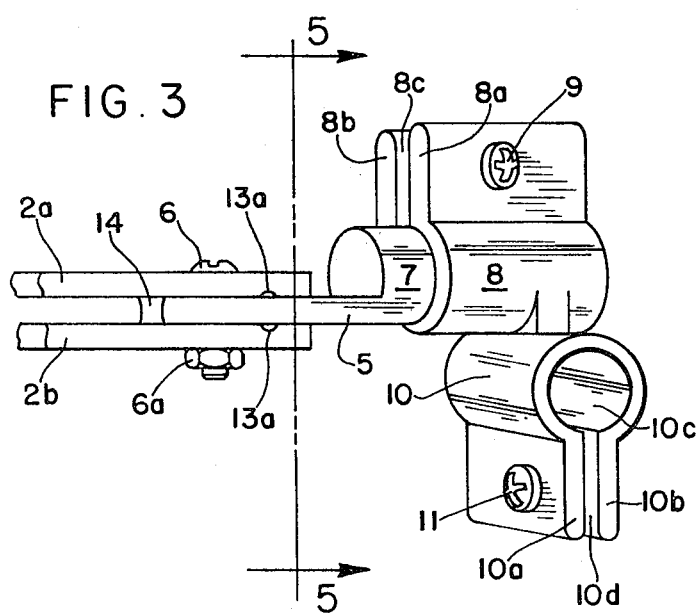
FIG. 3 is a perspective enlarged view of the bracket support assembly in detail.
Figure 4:
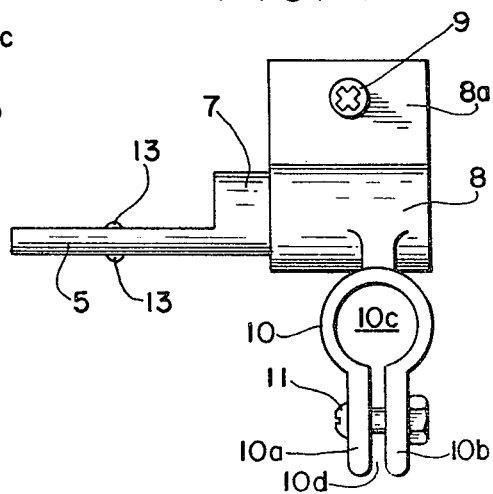
FIG. 4 is a side elevation view of the bracket assembly.

There is located adjacent to the fulcrum swivel cutouts 13a, an arm strut 14 securing the upper segment 2a with the lower segment 2b to form the arm 2. There is also located between strut 14 and the fulcrum swivel cutouts 13a, a screw 6 with its nut 6a for securing the tongue 5 into the position shown in FIG. 3. At the end of the arm 2 is the reflector mount 3 and the reflector 3a thereupon. Conventional methods of fastening reflector 3a to mount 3.

Only one side of reflector mount 3 is shown in the drawing, and it is contemplated that a second reflector 3a may be fastened on the opposite side from the reflector 3a which is shown.

There is a a space or slot 4 between both parallel segments 2a and 2b of the arm 2. In the top of the fulcrum clamp 8 is the lock screw assembly 9 which is similar in structure to the screw assembly 11 which is located in clamp 10.

In order to assemble the bracket and the arm, the clamp 10 is placed over the frame 1 of the bicycle 12. The screw 11 is placed through the opening in the flange 10a and passes through another opening in the flange 10b to which is attached a nut.

In the preferred embodiment, a Phillips screw is tightened with a Phillips screwdriver until the clamp 10 is securely surrounding the bike frame 1 and is locked thereto by the friction forces of the screw assembly 11. At the top of the clamp 10 and casted or molded integral therewith is located the clamp 8.

The tongue 5, which is an integral body extension of the cylinder 7, is placed therein. The arm assembly 2 is placed over the tongue 5.

Any adjustment of the screw 6 on the nut 6a permits the horizontal movement forward or backward of the arm 2 and therefore permits horizontal movement of the reflector member 3 forward or backward so that the reflector member 3 may be moved a position of 90° forward or 90° backward, totaling 180°.

When the arm 2 is not in use, upon loosening of screw 6, it may be moved back toward the rear wheel of the bicycle 12 and become parallel with it so it is out of the way. When arm 2 is in use, it may be pulled outwardly and locked into the desired position by tightening the screw 6.

The fulcrum mounts 13 enable with ease this movement and make the arm 2 positionable.

The cylinder 7 permits the rotation of the arm 2 a complete 360° on its own axis so that the reflector member 3 at the end of arm 2 may be facing up, down or at an angle to the front and the rear. It is only necessary to loosen the Phillips screw 9 and rotate the cylinder 7 to the desired position or angle, and the entire arm 2 assembly which extends out therefrom from the tongue 5 will rotate in the same path or locus as the cylinder 7. Therefore, the arm 2 may be moved 90° backward or 90° forward, and also rotated 360° from top to bottom.

The reflector mount 3 has fastened to it by conventional fastening means a reflector 3a. A reflector 3a may be mounted on both sides of the mount 3.

In consideration of the foregoing, I claim:

1. An attachment for a bicycle or the like comprising of an extension arm, said extension arm having two parallel members, a strut connecting the said parallel members, a reflector member at the end of said arm between the said parallel members, a fulcrum swivel mount assembly, means located at the opposite end of said arm from said reflector member for connection with said fulcrum swivel mount assembly, a fulcrum clamp, said fulcrum clamp adapted to be fastened to said fulcrum swivel mount assembly, a bicycle clamp being adapted to be fastened to a frame member of a bicycle, said fulcrum clamp being an integral part of the body of said bike clamp, a reflector adapted to be mounted on said reflector member whereby said extension arm may be rotated forward or backward on said fulcrum mount and whereby said extension arm may be rotated about its own axis 360°, said fulcrum swivel mount assembly comprises of a fulcrum cylinder, a tongue having flat upper and lower surfaces and extending outwardly from said fulcrum cylinder, pivot mounts protruding upwardly and downwardly from said upper and lower tongue surfaces, a fulcrum cutout in each segment of said parallel segments of said extension arm adapted to mount said pivot mounts therein, said fulcrum cylinder adapted to be inserted within said fulcrum cylinder and adapted to be inserted within said fulcrum clamp.

2. An attachment for a bicycle as described in claim 1 whereby the fulcrum clamp is cylindrical in shape and is adapted to receive within its interior the fulcrum cylinder, parallel and separated flanges extending upwardly from the body of said fulcrum clamp, and fastening means located in said flanges for exerting pressure on said flanges to cause the fulcrum clamp to secure said fulcrum cylinder into locked position within said fulcrum clamp, and whereby unlocking said fastening means in said fulcrum clamp flanges, the fulcrum cylinder may be rotated to any position within 360°.

3. An attachment for a bicycle as described in claim 2 whereby the bicycle clamp body portion extends downwardly from said fulcrum clamp, parallel and separated flanges extending downwardly from said bicycle clamp body, said bicycle clamp body adapted to circumscribe one of the fork frames of a bicycle, and fastening means for exerting pressure on said downwardly extending flanges to cause said bicycle clamp to secure itself to said bicycle frame into a locked position.

4. An attachment for a bicycle as described in claim 1 whereby a fulcrum assembly bolt passes through an opening in the upper and lower segment of the said extension arm adjacent to the end of said tongue whereby the extension arm is moveably fastened to the tongue on the fulcrum pivots and the position of said arm may be moved forward or rearward on said pivots upon the unlocking of said bolt and nut.

5. An attachment for a bicycle as described in claim 2 whereby a fulcrum assembly bolt passes through an opening in the upper and lower segment of the said extension arm adjacent to the end of said tongue whereby the extension arm is moveably fastened to the tongue on the fulcrum pivots and the position of said arm may be moved forward or rearward on said pivots upon the unlocking of said bolt and nut.

6. An attachment for a bicycle as described in claim 3 whereby a fulcrum assembly bolt passes through an opening in the upper and lower segment of the said extension arm adjacent to the end of said tongue pivots whereby the extension arm is moveably fastened to the tongue and fulcrum pivots and the position of said arm may be moved forward or rearward on said pivots upon the unlocking of said bolt and nut.

* * * * *